(12) United States Patent
Park

(10) Patent No.: US 7,540,249 B2
(45) Date of Patent: Jun. 2, 2009

(54) ACCELERATION SYSTEM FOR LINK BELT-MOUNTED SHIP

(76) Inventor: Nam Soo Park, Citybill 101 dong, 802 ho, 88-5 hdan-1dong saha-gu, Busan 604-823 (KR)

( * ) Notice: Subject to any disclaimer, the term of this patent is extended or adjusted under 35 U.S.C. 154(b) by 0 days.

(21) Appl. No.: 11/793,552

(22) PCT Filed: Nov. 12, 2004

(86) PCT No.: PCT/KR2004/002931

§ 371 (c)(1),
(2), (4) Date: Jun. 18, 2007

(87) PCT Pub. No.: WO2006/046788

PCT Pub. Date: May 4, 2006

(65) Prior Publication Data

US 2008/0214070 A1     Sep. 4, 2008

(30) Foreign Application Priority Data

Oct. 26, 2004  (KR) ............... 10-2004-0085561

(51) Int. Cl.
*B63B 1/34* (2006.01)
*B63H 1/34* (2006.01)
(52) U.S. Cl. .................... 114/67 R; 440/96
(58) Field of Classification Search ........... 114/67 R; 440/96
See application file for complete search history.

(56) References Cited

U.S. PATENT DOCUMENTS

| | | | | |
|---|---|---|---|---|
| 1,380,296 A | * | 5/1921 | Hill ............... | 114/163 |
| 1,840,725 A | * | 1/1932 | Lake ............... | 114/67 R |
| 2,318,789 A | * | 5/1943 | Lombardini ........ | 114/67 R |
| 2,377,143 A | * | 5/1945 | Golden ............. | 114/67 R |
| 2,527,327 A | * | 10/1950 | Peters ............. | 114/67 R |
| 2,586,218 A | * | 2/1952 | Gazda .............. | 440/95 |
| 3,621,803 A | * | 11/1971 | Foster ............. | 114/67 R |
| 3,656,450 A | * | 4/1972 | Farman ............. | 440/95 |
| 4,772,237 A | | 9/1988 | Zalkauskas | |

(Continued)

FOREIGN PATENT DOCUMENTS

JP        58145291        9/1983

(Continued)

OTHER PUBLICATIONS

International Search Report; PCT/KR2004/002931; Jul. 25, 2005.

*Primary Examiner*—Jesús D Sotelo
(74) *Attorney, Agent, or Firm*—Cantor Colburn LLP

(57) ABSTRACT

An acceleration system for a link belt-mounted ship includes; water wheels, rotating shafts mounted through the water wheels, link belts surrounding the water wheels and formed at an outer peripheral surface thereof with hook-shaped blades, ball bearing units mounted external to the water wheels so that the rotating shafts are inserted therethrough, square pipes onto which the ball bearing units are bolted, hinges bolted onto the square pipes and each hinge having a hinge rod bolted to the hull, and hydraulic cylinders fastened on the square pipes so that they are fixed to the bottom surface of the hull by way of upper brackets and associated pins, and fixed to the square pipes by way of lower brackets and associated pins.

4 Claims, 4 Drawing Sheets

U.S. PATENT DOCUMENTS 6,116,176 A * 9/2000 Jones ................. 114/67 R
6,508,188 B2 * 1/2003 Dong et al. ............. 114/67 R

FOREIGN PATENT DOCUMENTS

| JP | 08-301189 | 11/1996 |
| JP | 10-181687 | 7/1998 |
| KR | 100244737 B1 | 11/1999 |
| KR | 1020000039958 A | 7/2000 |

* cited by examiner

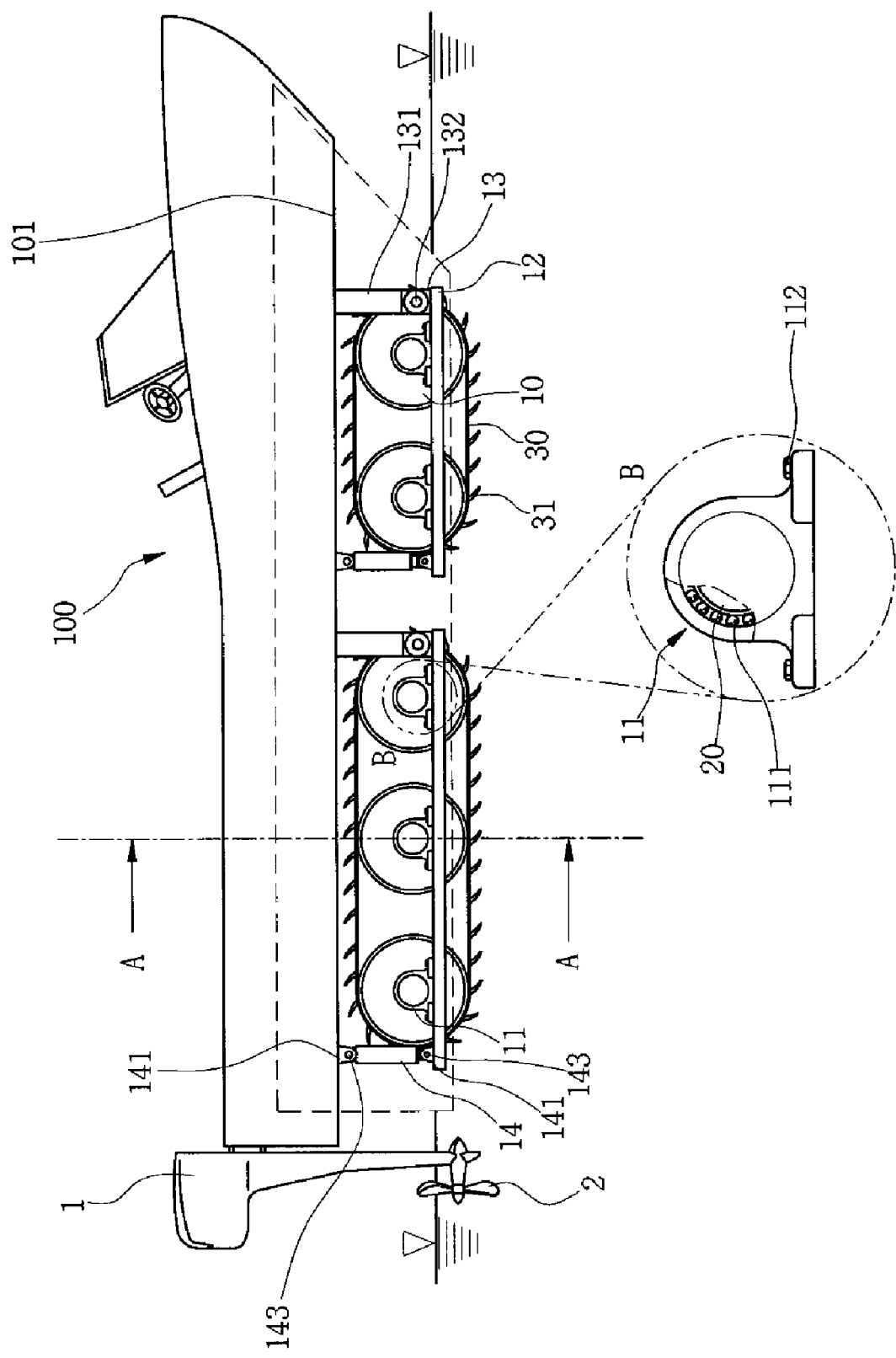
[Fig. 1]

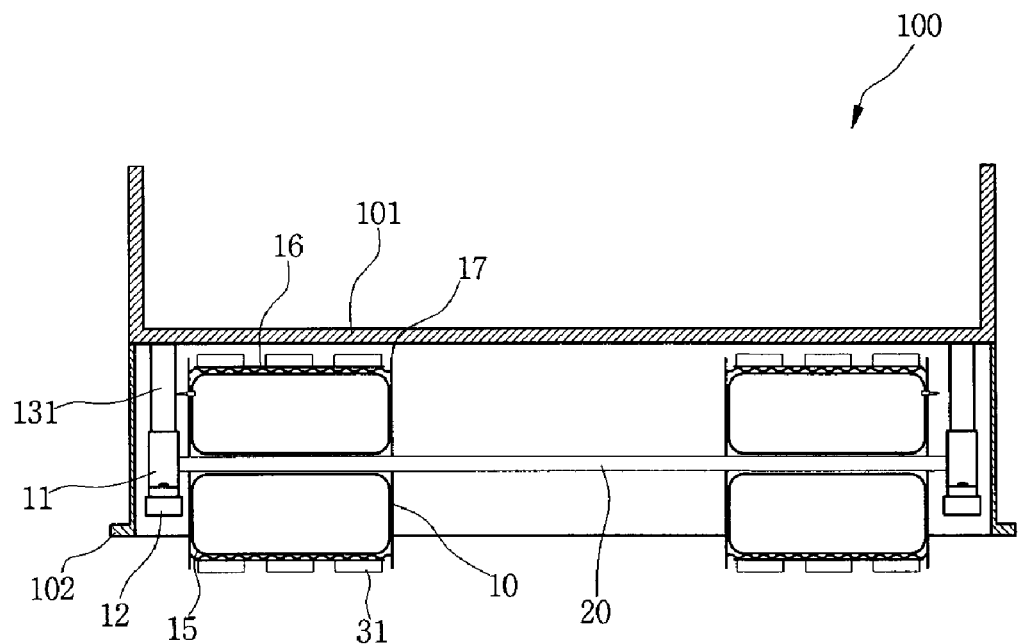
[Fig. 2]
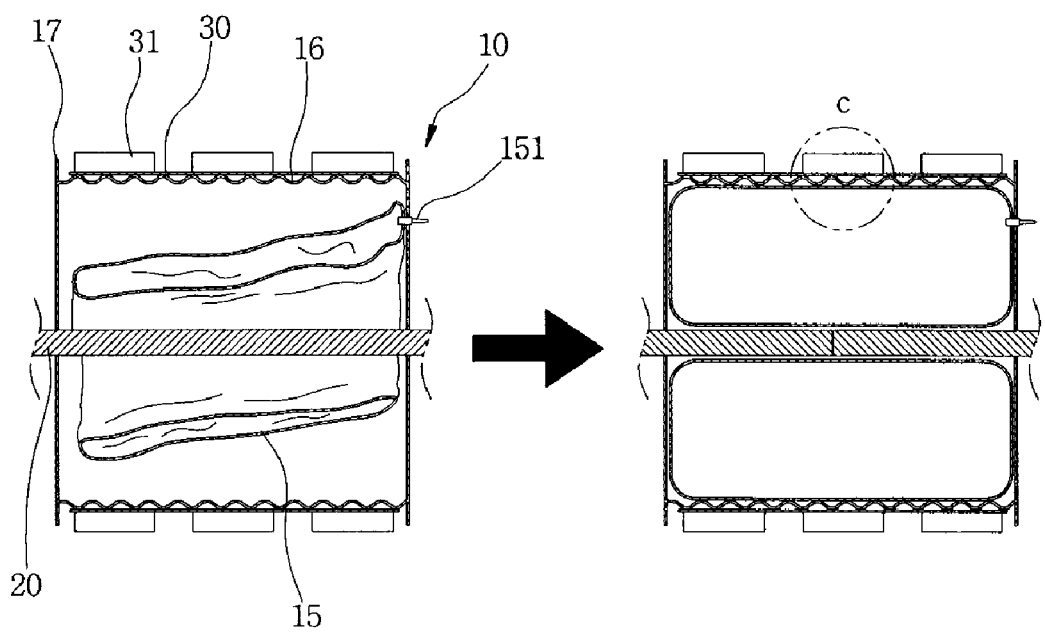
[Fig. 3]

[Fig. 4]
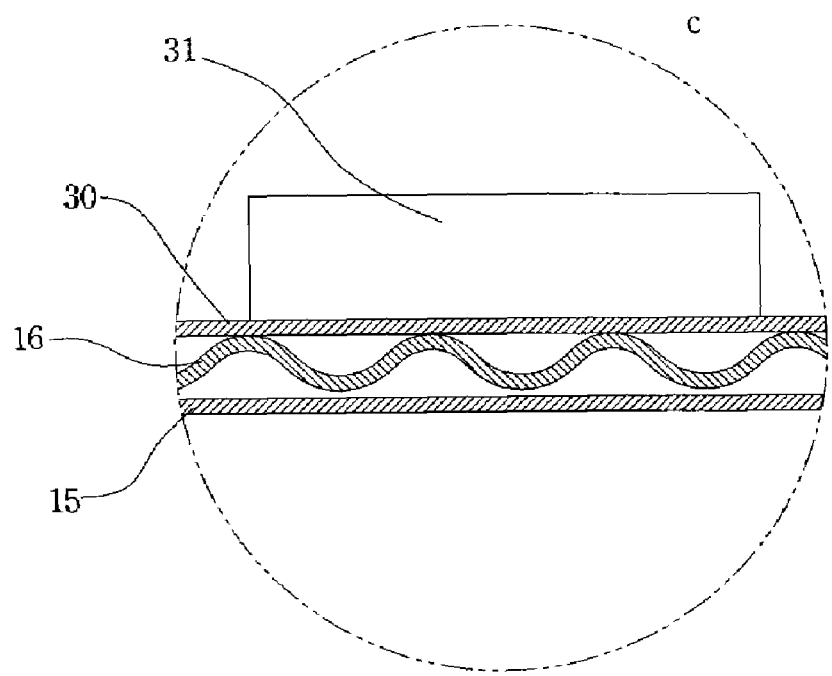
[Fig. 5]
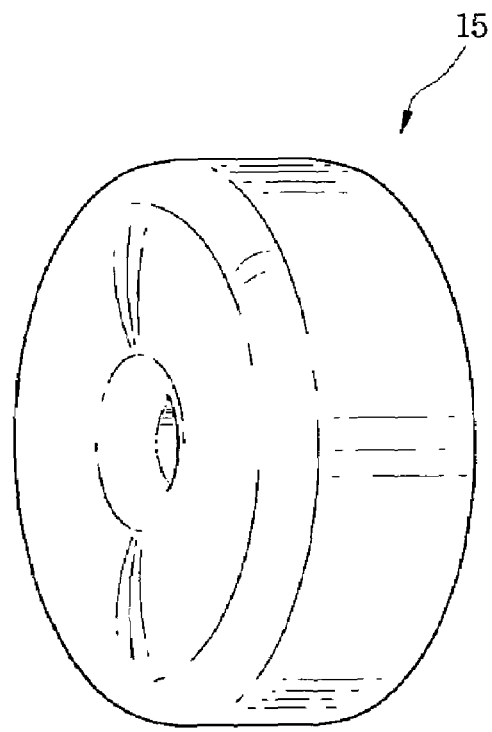

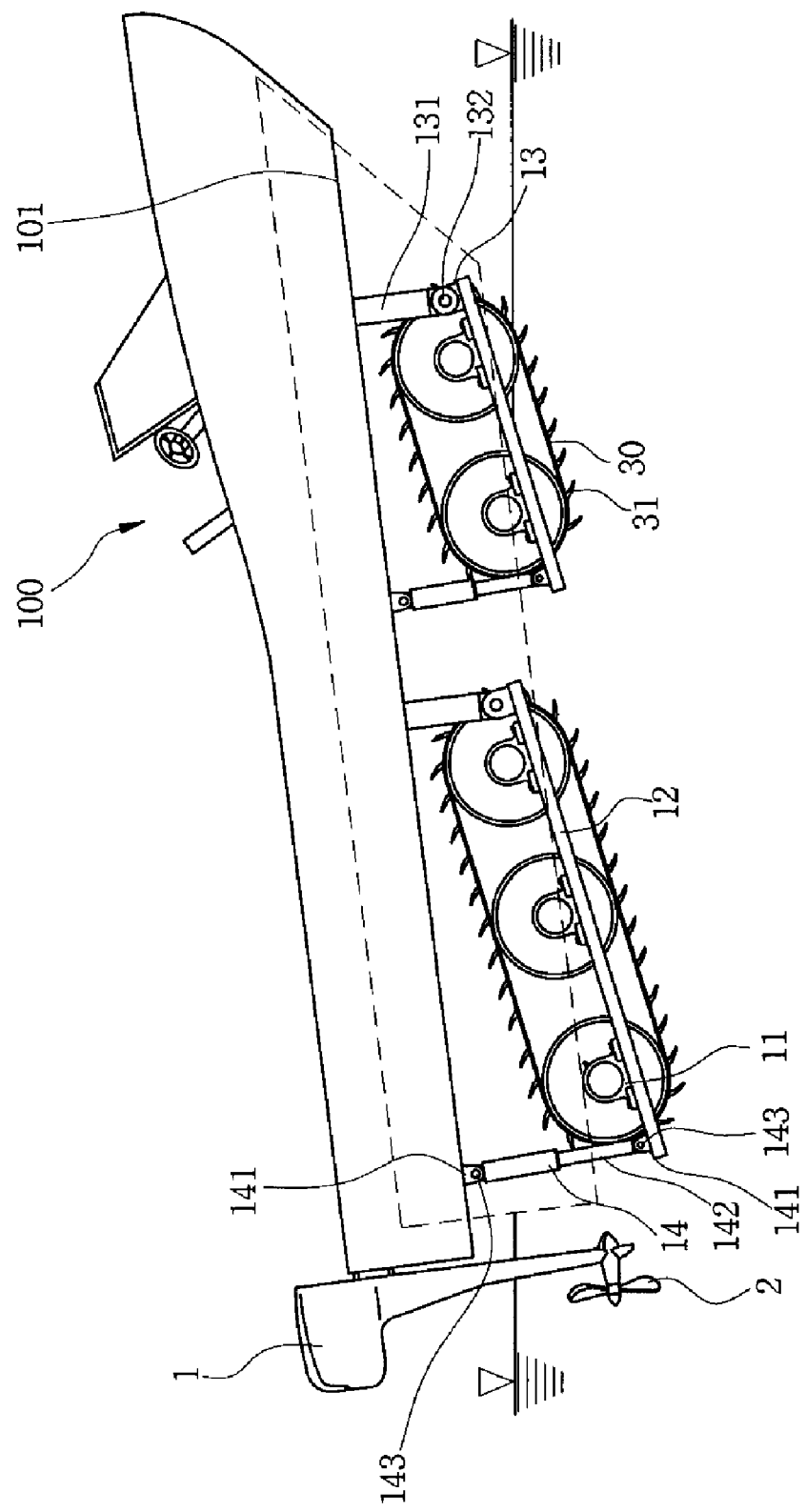
[Fig. 6]

ACCELERATION SYSTEM FOR LINK BELT-MOUNTED SHIP

TECHNICAL FIELD

The present invention relates to an acceleration system for a link belt-mounted ship, and more particularly, to an acceleration system for a link belt-mounted ship which is configured in such a fashion that a plurality of hollow water wheels are mounted along a lower end of a hull of the ship and a rubber tube is mounted in a hollow interior space of the respective water wheels in order to increase a buoyancy, thereby being capable of minimizing frictional resistance of the hull during movement, and that rotating shafts of the water wheels are mounted through ball bearing units, further reducing the frictional resistance of the hull and enabling smooth movement thereof on the water surface.

BACKGROUND ART

Generally, ships are water transportation means for transporting people, various cargo, and the like. The ships are constructed to be propelled and steered by way of a propelling power, which is obtained as screws of the ship, immersed under water, rotate to expel the water upon receiving a driving force transmitted from a power source through transmission shafts. The power source for the ships is selected from among an internal combustion engine, steam engine, electric motor, and the like.

Conventionally, the screws connected to the power source, namely, motor through the transmission shafts are located at the stern of the hull of the ship, and adapted to propel the ship forward or backward while rotating using the driving force of the motor. During rotation, the screws further cause steering plates installed at the stern of the ship to operate, so as to vary traveling directions of the ship. Such screws and steering plates are controlled from a steering house or the like, and the traveling direction and speed of the ship are determined according to the rotation direction and speed of the screws.

In case of the conventional ships as stated above, they should be principally propelled by rotation energy of the screws caused by the motor as well as water current energy. The water current energy is generated as the rotating screws expel the water thus generating backward water currents. The generated water currents, however, are actually dissipated without affecting the propulsion of the ship. Therefore, the conventional ships have a difficulty of increasing their propelling power beyond a predetermined value.

As another problem of the conventional ships, although they are streamlined in order to reduce a friction coefficient for achieving innovation of their structure, there is a limitation in effectively reducing the friction coefficient and a risk of massive waves, which are generated by the water expelled during traveling of the ship. For reference, waves generated when a naval destroyer travels at thirty-eight knots (about seventy kilometers an hour) considerably affect locations up to and beyond one kilometer away.

As can be seen from the above description, since the conventional ships are considerably affected by a frictional resistance, in order to prevent deterioration of the speed thereof, it is necessary to make special studies of both the hull shape of the ship and a high-horsepower engine.

In order to solve the above-mentioned problems, many studies have been developed with relation to propulsion devices for the ships. As one example, a Korean Patent Laid-open Publication No. 2000-0039958 discloses a hydraulic driven type propulsion device for use in a ship, which is attached to the stern wall of the ship and has a structure and function for simply performing forward and backward movements of a propeller thereof. Considering the structure of the disclosed propulsion device in detail, it comprises a closed type hydraulic system circuit configured in such a way that a hydraulic pressure is generated as a hydraulic pump is driven by a high-speed diesel engine of less than 350 horsepower, and the generated hydraulic pressure is supplied to a hydraulic motor, which is installed within a body of the propulsion device and directly connected to the propeller so as to operate it. According to the closed type hydraulic system circuit, it is possible to achieve a high-pressure and high-speed operation so that an operating hydraulic pressure reaches 250 atmospheres and the revolutions per minute of the hydraulic motor reaches 2500 rpm, and consequently to adjust an inclination angle of the hydraulic pump within a range of 90° upward and downward at a remote place, resulting in a control in the flow of operating fluid. The disclosed propulsion device, however, has a disadvantage in that the overall structure thereof is complex, and it has no function for increasing the propelling power thereof by the use of water surface tension and water resistance.

As another example, Korean Patent Laid-open Publication No. 1999-0038271 discloses a ship having a leakage oil collection function using water wheels. In this disclosed ship, both at the stem and stern of the hull are installed water wheels through shafts. The water wheels are formed at their outer peripheral surfaces with outwardly protruding blades and adapted to obtain the buoyancy of the hull and a thrust force as they rotate upon receiving a driving force of the ship. Here, one of the water wheels installed at the stem of the hull serves to provide a steering ability using a steering device, and the tube-shaped outer peripheral surfaces of the water wheels are further formed with brushes, in addition to the blades, so as to adsorb leakage oil. The adsorbed oil is removed by a scrapper and collected in an oil storage tank. The disclosed Korean Patent Laid-open Publication No. 1999-0038271 is somewhat similar to the present invention in that it achieves a propelling power thereof by using the water wheels formed with the blades. However, the disclosed invention does not express an important outstanding feature caused from a link belt of the present invention wherein the link belt is installed to wholly surround around the water wheels and adapted to be accelerated by water resistance and water surface tension, as opposed to being conventionally connected and propelled by a propulsion device.

DISCLOSURE OF INVENTION

Technical Problem

Therefore, the present invention has been made in view of the above problems, and it is an object of the present invention to provide an acceleration system for a link belt-mounted ship, which can accelerate the speed of the ship with a low propelling power, and is simple and effective in manufacture thereof.

In accordance with the present invention, the above and other objects can be accomplished by the provision of an acceleration system for a link belt-mounted ship comprising: water wheels mounted along lower ends of opposite lateral surfaces of a hull of the ship; rotating shafts each penetrating through the center of the associated two water wheels; link belts each surrounding a group of the water wheels and formed with hook-shaped blades protruding outward from an outer peripheral surface of the link belt and spaced apart from one another by a regular distance; ball bearing units mounted, respectively, external to the water wheels so that the rotating shafts are inserted through ball bearings thereof; square pipes onto which lower ends of the ball bearing units are bolted; hinges bolted at their bottom surfaces onto one end of the respective square pipes, each hinge having a hinge rod bolted and fixed to a bottom surface of the hull, and a hinge shaft located under the hinge rod; and hydraulic cylinders fastened on the square pipes at opposite sides of the hinges, each hydraulic cylinder having a pair of upper and lower brackets, pins inserted in the respective brackets, and a cylinder located between the upper and lower brackets, so that the hydraulic cylinder is fixed at an upper end thereof to the bottom surface of the hull by way of the upper bracket and the associated pin, and at a lower end thereof to the square pipe by way of the lower bracket and the associated pin.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a side sectional view illustrating an acceleration system for a link belt-mounted ship in accordance with the present invention;

FIG. 2 is a cross sectional view taken along the line A-A shown in FIG. 1;

FIG. 3 is a cross sectional view illustrating before and after injecting high-pressure air into a rubber tube mounted in a water wheel in accordance with the present invention;

FIG. 4 is an enlarged detailed view illustrating the circle C shown in FIG. 3;

FIG. 5 is a perspective view illustrating the configuration of the rubber tube in accordance with the present invention; and FIG. 6 is a side sectional view schematically illustrating a state wherein water wheels surrounded by link belts are propelled by means of hydraulic cylinders so as to be tilted.

BEST MODE FOR CARRYING OUT THE INVENTION

Now, a preferred embodiment of the present invention will be explained with reference to the accompanying drawings.

FIG. 1 is a side sectional view illustrating an acceleration system for a link belt-mounted ship in accordance with the present invention. FIG. 2 is a cross sectional view taken along the line A-A shown in FIG. 1. FIG. 3 is a cross sectional view illustrating before and after injecting high-pressure air into a rubber tube mounted in a water wheel in accordance with the present invention. FIG. 4 is an enlarged detailed view illustrating the circle C shown in FIG. 3. FIG. 5 is a perspective view illustrating the configuration of the rubber tube in accordance with the present invention. FIG. 6 is a side sectional view schematically illustrating a state wherein water wheels surrounded by link belts are moved by means of hydraulic cylinders in their inclined state.

As can be seen from FIGS. 1 and 2 shown as side and cross sectional views illustrating an acceleration system for a link belt-mounted ship according to the present invention, the acceleration system of the present invention basically comprises: water wheels 10 mounted along lower ends of opposite lateral surfaces of a hull 100 of the ship, rotating shafts 20 each penetrating through the center of the associated two water wheels 10, and link belts 30 each surrounding a group of the water wheels 10 and formed with hook-shaped blades 31. The blades 31 protrude outward from an outer peripheral surface of the link belt 30 and are spaced apart from one another by a regular distance.

The acceleration system of the present invention further comprises: ball bearing units 11 mounted, respectively, external to the water wheels 10 so that the rotating shafts 20 are inserted through ball bearings thereof, square pipes 12 onto which lower ends of the ball bearing units 11 are bolted, hinges 13 bolted at their bottom surfaces onto the square pipes 12, and hydraulic cylinders 14 fastened on the square pipes 12 at opposite sides of the hinges 13. Each of the hinges 13, located at one end of the square pipe 12, includes: a hinge rod 131 bolted and fixed to a bottom surface 101 of the hull 100, and a hinge shaft 132 located under the hinge rod 131. Each of the hydraulic cylinders 14 includes: a pair of upper and lower brackets 141, pins 143 inserted in the respective brackets 143, and a cylinder 142 located between the upper and lower brackets 141. The hydraulic cylinder 14 is fixed at an upper end thereof to the bottom surface 101 of the hull 100 by way of the upper bracket 141 and the associated pin 143, and at a lower end thereof to the square pipe 12 by way of the lower bracket 141 and the associated pin 143.

As can be seen from FIG. 3, in the water wheels 10 are mounted rubber tubes 15, respectively. Each of the rubber tubes 15 has an air injection port 151 formed at an upper end of one side thereof.

During motion, into the rubber tubes 15, which are typically not expanded with air, are injected air, in order to raise the hull 100 as high as possible. This minimizes friction of the ship body 100 relative to water surface during motion.

As shown in FIG. 4, an outer peripheral surface of the water wheel 10 is evenly formed with fine corrugations 16, enhancing contact between the water wheel 10 and the link belt 30.

Referring again to FIG. 3, at opposite sides of the outer peripheral surface of the water wheel 10 are formed separation preventing lobes 17, respectively. The lobes 17 serve to prevent the link belt 30 from being unintentionally separated from the water wheel 10.

Meanwhile, as shown in FIG. 2, fins 102 are formed at lower ends of the opposite lateral surfaces of the hull 100, respectively. The fins 102 are effective to minimize a frictional coefficient caused at the lateral surfaces of the ship hull 100.

As can be seen from the above described configuration according to the present invention, the link belt 30 has a tendency of remaining at its original position without sliding due to the influence of water resistance generated by virtue of the blades 31 formed at the outer peripheral surface thereof. In this state, if a propelling power is applied to the link belt 30 under operation of a certain propulsion device, the hull 100 is subjected to strong water resistance at both the lateral surfaces thereof. The strong water resistance causes the link belt 30 to rotate toward the stern of the hull 100.

When the link belt-mounted ship of the present invention travels at less than ten knots, the water wheels 10 may be stationary without rotation, but if the ship travels by a speed exceeding the above value, the blades 31 of the link belt 30 are strongly subject to water resistance, thereby causing the link belt 30 to show a tendency of remaining at its original non-operating position. As the traveling speed of the ship increases further, the overall surface of the link belt 30 is strongly subject to water surface tension, resulting in a gradual rising of the ship hull 100.

Now, the operation of the present invention will be explained. The link belt-mounted ship of the present invention is accelerated in the following manner. First, a screw 2 installed at the stern of the ship rotates according to the driving operation of a propulsion device 1 so as to provide a propelling power to the hull 100 of the ship. Then, the water wheels 10 are rotated due to water resistance applied to both the lateral surfaces of the hull 100 as the propelling power is increased, thereby causing the link belt 30 connected with the water wheels 10 to circulate in a direction toward the stern of the hull 100. As the propelling power is further increased, the blades 31 of the link belt 30 are subject to stronger water resistance and the link belt 30 is strongly affected by water surface tension, resulting in a gradual rising of the front side of the hull 100 and accordingly an acceleration of the ship.

That is, in a state wherein the link belt 30 is intended to maintain its original non-operating position without sliding, the hull 100 is advanced upon receiving the strong propelling power applied to the stern of the hull 100. Then, as the propelling power of the propulsion device 1 is increased further, a stronger water resistance is applied to the blades 31 formed at the outer peripheral surface of the link belt 30, thereby increasing the water surface tension of the link belt 30. This results in a gradual rising in the stem of the hull 100, thereby causing the blades 31 of the link belt 30 at the stem of the hull 100 to advance while plowing the waves, resulting in a maximized acceleration in the speed of the ship.

In the present invention, the water wheel 10 is made of aluminum or other light rigid materials.

Alternatively, the hollow interior space of the water wheel 10 is maintained in an empty state without the rubber tube 15.

INDUSTRIAL APPLICABILITY

As apparent from the above description, the present invention provides an acceleration system for a link belt-mounted ship, which is configured to maximize the speed of the ship by the use of a propelling power generated by a certain propulsion device thus reducing consumption of fuel. Further, awarding to the present invention, by virtue of the fact that all constitutive components of the ship take an individually assembled structure, as opposed to taking a monolithic structure, it is possible to simplify repair works thereof and to partially exchange only required defective components thus facilitating the manufacture thereof. Furthermore, as a result of minimizing a contact area between the bottom surface of the hull and water, the speed of the hull is increased. Such an increase in the speed of the ship is further achieved through the installation of ball bearings to water wheels. Such ball bearings improve sliding ability of the hull on the water surface, increasing the speed of the hull.

Finally, the water wheels of the present invention do not need any lubrication and cooling processes since a part of them are continuously immersed under the water. Therefore, the present invention is suitable for military ships requiring high-speed, in addition to leisure ships, lifesaving boats and high-speed passenger ships.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An acceleration system for a link belt-mounted ship comprising:
   water wheels mounted along lower ends of opposite lateral surfaces of a hull of the ship;
   rotating shafts each penetrating through the center of the associated two water wheels;
   link belts, each surrounding a group of the water wheels and formed with hook-shaped blades protruding outward from an outer peripheral surface of the link belt and spaced apart from one another by a regular distance;
   ball bearing units mounted, respectively, external to the water wheels so that the rotating shafts are inserted through ball bearings thereof;
   square pipes onto which lower ends of the ball bearing units are bolted;
   hinges bolted at their bottom surfaces onto one end of the respective square pipes, each hinge having a hinge rod bolted and fixed to a bottom surface of the hull, and a hinge shaft located under the hinge rod; and
   hydraulic cylinders fastened on the square pipes at opposite sides of the hinges, each hydraulic cylinder having a pair of upper and lower brackets, pins inserted in the respective brackets, and a cylinder located between the upper and lower brackets, so that the hydraulic cylinder is fixed at an upper end thereof to the bottom surface of the hull by way of the upper bracket and the associated pin, and at a lower end thereof to the square pipe by way of the lower bracket and the associated pin.

2. The system as set forth in claim 1, further comprising:
   rubber tubes each mounted in the respective water wheels and having an air injection port formed at an upper end of one side thereof.

3. The system as set forth in claim 1, wherein an outer peripheral surface of the water wheel is evenly formed with fine corrugations, enhancing contact between the water wheel and the link belt.

4. The system as set forth in claim 1, wherein at opposite sides of an outer peripheral surface of the water wheel are formed separation preventing lobes, respectively, for preventing the link belt from being unintentionally separated from the water wheel.

* * * * *